US012599928B2

(12) United States Patent
Suzuki et al.

(10) Patent No.: US 12,599,928 B2
(45) Date of Patent: Apr. 14, 2026

(54) SUBSTRATE PROCESSING APPARATUS AND SUBSTRATE PROCESSING METHOD

(71) Applicant: SCREEN HOLDINGS CO., LTD., Kyoto (JP)

(72) Inventors: Masafumi Suzuki, Kyoto (JP); Shigehiro Goto, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 0 days.

(21) Appl. No.: 18/437,989

(22) Filed: Feb. 9, 2024

(65) Prior Publication Data

US 2024/0286168 A1 Aug. 29, 2024

(30) Foreign Application Priority Data

Feb. 24, 2023 (JP) ................................ 2023-027286

(51) Int. Cl.
*B05B 12/12* (2006.01)
*B05B 13/02* (2006.01)
(Continued)

(52) U.S. Cl.
CPC .............. *B05D 1/02* (2013.01); *B05B 12/124* (2013.01); *B05B 13/0221* (2013.01); *B05B 15/70* (2018.02); *B05C 11/1013* (2013.01)

(58) Field of Classification Search
USPC ......................... 118/401, 679–682, 692, 686
See application file for complete search history.

(56) References Cited

U.S. PATENT DOCUMENTS 6,495,205 B1 12/2002 Gibson et al. ................ 427/240
2006/0096528 A1 * 5/2006 Kawatake ............. B05C 5/0262
118/407

(Continued)

FOREIGN PATENT DOCUMENTS

JP 2005-199208 A 7/2005
JP 2005268595 A * 9/2005

(Continued)

OTHER PUBLICATIONS

English Translation JP-2005268595-A (Year: 2005).*
Extended European Search Report dated Jul. 29, 2024 in corresponding European Patent Application No. 24158537.1.

*Primary Examiner* — Yewebdar T Tadesse
(74) *Attorney, Agent, or Firm* — OSTROLENK FABER LLP

(57) ABSTRACT

A substrate processing apparatus includes a holder that holds a substrate, a nozzle having a bottom portion in which a discharge port extending in one direction is formed, a mover that, above the substrate held by the holder, relatively moves at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action, and a controller that controls the mover and relatively moves the nozzle and the substrate at a moving speed determined based on an outer peripheral shape of the substrate.

6 Claims, 7 Drawing Sheets

(51) Int. Cl.

| | |
|---|---|
| ***B05B 15/70*** | (2018.01) |
| ***B05C 11/10*** | (2006.01) |
| ***B05D 1/02*** | (2006.01) |

(56) References Cited

U.S. PATENT DOCUMENTS

| | | | | |
|---|---|---|---|---|
| 2009/0130614 | A1* | 5/2009 | Ookouchi | H01L 21/6719 399/246 |
| 2015/0336114 | A1 | 11/2015 | Wakamoto | |

FOREIGN PATENT DOCUMENTS

| | | | |
|---|---|---|---|
| JP | 2005-340381 | A | 12/2005 |
| JP | 2008-264782 | A | 11/2008 |
| JP | 2015-221401 | A | 12/2015 |
| JP | 2017-148769 | A | 8/2017 |
| JP | 2017-164700 | A | 9/2017 |
| JP | 6272138 | B2 | 1/2018 |
| JP | 2019-046850 | A | 3/2019 |
| JP | 2022-143661 | A | 10/2022 |

* cited by examiner

SUBSTRATE PROCESSING APPARATUS AND SUBSTRATE PROCESSING METHOD

BACKGROUND

Technical Field

The present disclosure relates to a substrate processing apparatus and a substrate processing method.

Description of Related Art

As a technique for applying a processing liquid such as a resist liquid to a substrate, a capillary coating technique for utilizing capillary action in the step of manufacturing a substrate such as a semiconductor substrate, a substrate for an FPD (Flat Panel Display) such as a liquid crystal display device or an organic EL (Electro Luminescence) display device, a substrate for an optical disc, a substrate for a magnetic disc, a substrate for a magneto-optical disc, a substrate for a photomask, a ceramic substrate or a substrate for a solar battery is known.

For example, JP 2005-199208 A describes a coating device including a coating tank, a coating tank vertical moving means for vertically moving the coating tank and a coating nozzle that supplies a coating liquid to a substrate with use of slit coating.

SUMMARY

However, in regard to the capillary coating technique using capillary action, there is a problem that the thickness of a film of a processing liquid is larger in a portion near the outer periphery of a substrate than in other portions.

An object of the present disclosure is to provide a substrate processing apparatus and a substrate processing method with which it is possible to suppress variations in thickness of a film of a processing liquid formed on a substrate.

(1) A substrate processing apparatus according to one aspect of the present disclosure includes a holder that holds a substrate with a main surface of the substrate directed upwardly, the substrate having an at least partially circular outer periphery, a nozzle having a bottom portion in which a discharge port extending in one direction is formed, a mover that, above the substrate held by the holder, relatively moves at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action, and a controller that controls the mover and relatively moves the nozzle and the substrate at a moving speed determined based on an outer peripheral shape of the substrate.

(2) A substrate processing method according to another aspect of the present disclosure performed in a substrate processing apparatus, wherein the substrate processing apparatus includes a holder that holds a substrate with a main surface of the substrate directed upwardly, the substrate having an at least partially circular outer periphery, and a nozzle having a bottom portion in which a discharge port extending in one direction is formed, and the substrate processing method includes a moving step of, above the substrate held by the holder, relatively moving at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action, and determining a moving speed at which the nozzle and the substrate are relatively moved based on an outer peripheral shape of the substrate.

With the present disclosure, it is possible to suppress variations in thickness of a film of a processing liquid formed on a substrate.

Other features, elements, characteristics, and advantages of the present disclosure will become more apparent from the following description of preferred embodiments of the present disclosure with reference to the attached drawings.

DETAILED DESCRIPTION

A substrate processing apparatus according to one embodiment of the present disclosure will be described below with reference to the drawings. In the following description, a substrate refers to a substrate for an FPD (Flat Panel Display) that is used for a liquid crystal display device, an organic EL (Electro Luminescence) display device or the like, a semiconductor substrate, a substrate for an optical disc, a substrate for a magnetic disc, a substrate for a magneto-optical disc, a substrate for a photomask, a ceramic substrate, a substrate for a solar cell or the like. Further, as a processing subject of the below-mentioned substrate processing apparatus 100, a substrate having a circular shape with a radius r in plan view and having a notch in part of its outer periphery will be described by way of example. The substrate W to be processed by the substrate processing apparatus 100 may have a substantially circular shape.

(1) Configuration of Substrate Processing Apparatus 100

Figure 1:
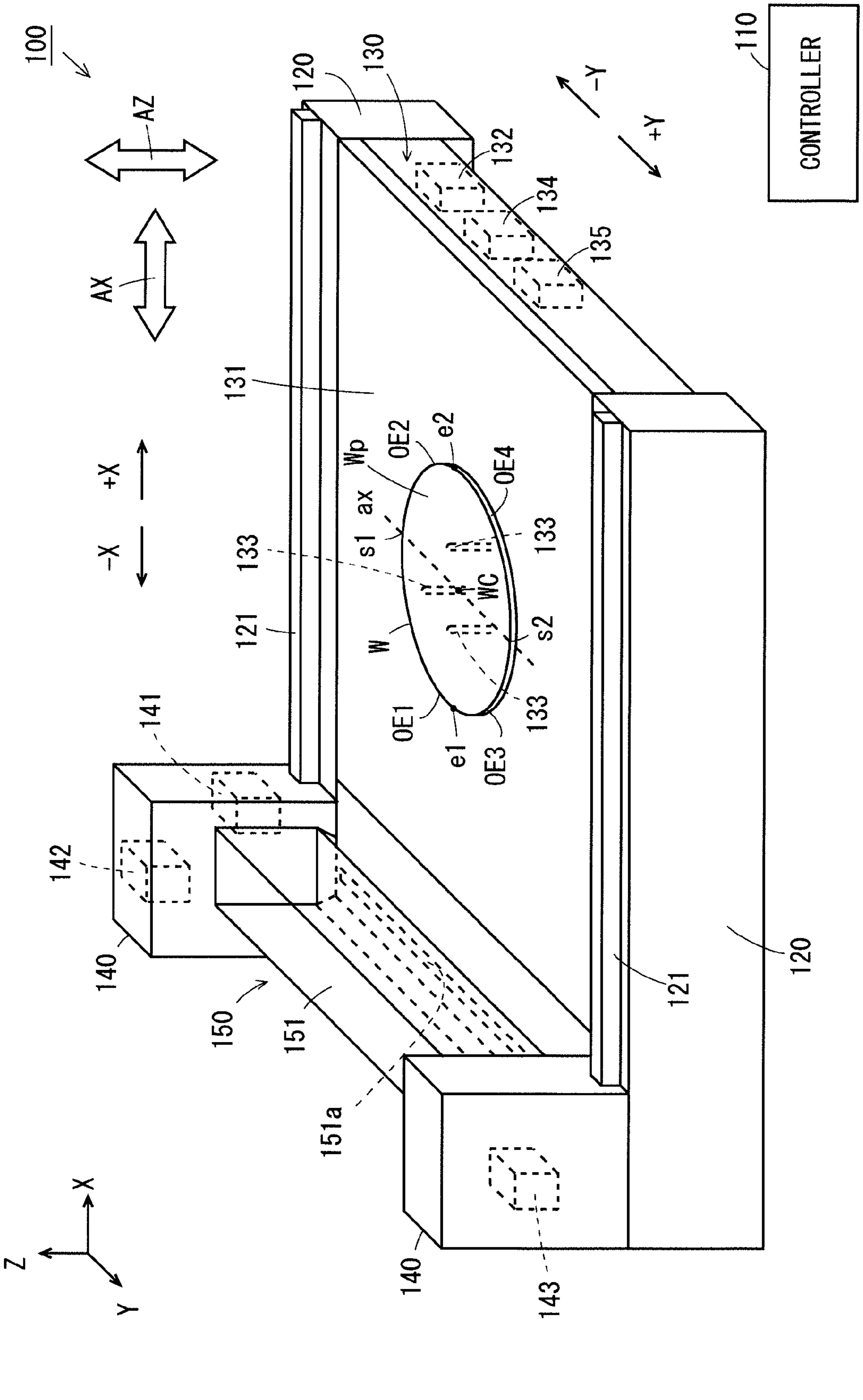
FIG. 1 is a schematic external perspective view of a substrate processing apparatus.

FIG. 1 is a schematic external perspective view of the substrate processing apparatus 100. The substrate processing apparatus 100 according to the present embodiment supplies a coating liquid such as a resist liquid as a processing liquid onto the substrate W.

As shown in FIG. 1, the substrate processing apparatus 100 includes a controller 110, a pair of stage supports 120, a stage device 130, a pair of nozzle supports 140 and a nozzle device 150. FIG. 1 and subsequent predetermined diagrams are accompanied by arrows that indicate X, Y and Z directions orthogonal to one another for the clarity of a positional relationship. The X and Y directions are orthogonal to each other within a horizontal plane, and the Z direction corresponds to a vertical direction. In the following description, with respect to the X direction and the Y direction, directions in which the arrows are directed are referred to as a +X direction and a +Y direction, respectively, and directions opposite to the arrows are referred to as a −X direction and a −Y direction, respectively.

Each of the pair of two stage supports 120 has a cuboid shape, and is provided on the bottom surface of a casing (not shown) so as to extend in the X direction. The pair of stage supports 120 are arranged so as to be opposite to each other in the Y direction. A guide rail 121 extending in the X direction is provided on the upper surface of each stage support 120.

The stage device 130 is located between the pair of stage supports 120 in the Y direction and is supported by the two stage supports 120. The stage device 130 includes a plate member 131, a plate adjuster 132, a plurality (three in the present example) of support pins 133, a pin lifting-lowering driver 134 and a suction driver 135.

The plate member 131 is formed of a stone material having a rectangular flat plate shape, and constitutes an upper surface portion of the stage device 130. The substrate W to be processed is placed on part of the plate member 131. In the portion of the plate member 131 on which the substrate W is to be placed (hereinafter referred to as a substrate placement portion), a plurality of intake holes and a plurality of pin insertion holes (not shown) are formed so as to penetrate the plate member 131 in the Z direction.

The plate adjuster 132, the plurality of support pins 133, the pin lifting-lowering driver 134, the suction driver 135 and dummy coating plate drivers 138, 139 are provided in lower portions of the plate member 131. The plate adjuster 132 adjusts the temperature of the substrate placement portion of the plate member 131.

The plurality of support pins 133 are supported by the pin lifting-lowering driver 134 so as to be movable in an upward-and-downward direction and insertable into the plurality of pin insertion holes. The pin lifting-lowering driver 134 moves the plurality of support pins 133 in the upward-and-downward direction based on the control of the controller 110. Thus, the upper end portions of the plurality of support pins 133 are moved between a pin lifted position higher than the plate member 131 and a pin lowered position lower than the plate member 131.

Thus, when the substrate W is carried in, with the upper end portions of the plurality of support pins 133 located at the pin lifted position, the unprocessed substrate W held by the transport device (not shown) is transferred onto the plurality of support pins 133. Further, when the substrate W is carried out, with the upper end portions of the plurality of support pins 133 located at the pin lifted position, the unprocessed substrate W supported on the plurality of support pins 133 is received by the transport device (not shown). Further, during the process for the substrate W in the substrate processing apparatus 100, with the upper end portions of the plurality of support pins 133 located at the pin lowered position, the processing liquid is supplied to the substrate W placed on the substrate placement portion of the plate member 131 by the below-mentioned nozzle device 150.

The plurality of intake holes (not shown) formed in the plate member 131 are connected to exhaust equipment of a factory or the like through the suction driver 135 and an intake system such as an ejector (not shown). Based on the control of the below-mentioned controller 110, the suction driver 135 switches an intake path, which connects the plurality of intake holes to the intake system, between a communication state and a blocked state. With such a configuration, with the substrate W placed on the substrate placement portion of the plate member 131, the suction driver 135 can cause the substrate W to be held by suction at the substrate placement portion by bringing the intake path into the communication state. Further, with the substrate W held by suction at the substrate placement portion, the suction driver 135 can release the substrate W from the plate member 131 by bringing the intake path into the blocked state. In the present embodiment, the plate member 131 is an example of a holder.

Here, the portions in which a virtual straight line ax extending in the Y direction and passing through the center portion WC of the substrate W when the substrate W is placed on the plate member 131 intersects with the outer periphery of the substrate W are referred to as a first side portion s1 and a second side portion s2. Further, the portions in which a straight line extending in the X direction and passing through the center portion WC of the substrate W intersects with the outer periphery of the substrate W are referred to as a first end portion e1 and a second end portion e2. Further, the portion of the outer periphery of the substrate W extending from the first side portion s1 to the first end portion e1 is referred to as a partial outer edge OE1, and the portion of the outer periphery of the substrate W extending from the first side portion s1 to the second end portion e2 is referred to as a partial outer edge OE2. Further, the portion of the outer periphery of the substrate W extending from the second side portion s2 to the first end portion e1 is referred to as a partial outer edge OE3, and the portion of the outer periphery of the substrate W extending from the second side portion s2 to the second end portion e2 is referred to as a partial outer edge OE4.

Hereinafter, the upper surface of the substrate W is referred to as a substrate processing surface Wp. In the present embodiment, the substrate processing surface Wp of the substrate W is an example of a main surface of the substrate. The pair of nozzle supports 140 is provided on the upper surfaces of the pair of stage supports 120 so as to be movable in the X direction along the guide rails 121. The pair of nozzle supports 140 are arranged so as to be opposite to each other in the Y direction.

The nozzle device 150 is supported between the pair of nozzle supports 140 in the Y direction by the pair of nozzle supports 140. In at least one of the pair of nozzle supports 140, an X-direction driver 141, a Z-direction driver 142 and a liquid supplier 143 are incorporated. In the present embodiment, the nozzle supports 140 are an example of a moving mechanism (i.e., mover).

The nozzle device 150 includes a nozzle block 151 extending in the Y direction. The nozzle block 151 has an upper surface, a front surface, a rear surface, a front inclined surface, a rear inclined surface, a bottom surface and both of side surfaces. The bottom surface of the nozzle block 151 is formed flat and is arranged in parallel to the substrate processing surface Wp. The front end of the bottom surface is connected to the lower end of the front inclined surface, and the upper end of the front inclined surface is connected to the front surface. The rear end of the bottom surface is connected to the lower end of the rear inclined surface, and the upper end of the rear inclined surface is connected to the rear surface. The upper end of the front surface and the upper end of the rear surface are connected to the upper surface. Both ends of the upper surface, both ends of the front surface, both ends of the rear surface, both ends of the forward inclined surface, both ends of the rearward inclined surface and both ends of the bottom surface are respectively connected to both of the side surfaces. A slit-like discharge port 151*a* extending in the Y direction is formed in the bottom surface of the nozzle block 151. The length of the slit-like discharge port 151*a* in the Y direction is larger than the diameter of the substrate W. In the present embodiment, the nozzle block 151 of the nozzle device 150 is an example of a nozzle. Further, the nozzle block 151 is connected to a processing liquid supply system 160, which is described below with reference to FIG. 2, via the liquid supplier 143 provided in the nozzle support 140.

The X-direction driver 141 includes an actuator such as a motor, and moves the pair of nozzle supports 140 in the +X direction and −X direction along the guide rails 121 of the pair of stage supports 120 based on the control of the controller 110. The Z-direction driver 142 includes an actuator such as a motor, and moves the nozzle device 150 supported by the pair of nozzle supports 140 in the Z direction and its opposite direction (the upward-and-downward direction) based on the control of the controller 110. Thus, in the substrate processing apparatus 100, as indicated by the outlined arrows AX, AZ in FIG. 1, the nozzle device 150 can be moved in the +X direction and the upward-and-downward direction (+Z direction) on the substrate W placed on the plate member 131 of the stage device 130.

The controller 110 controls the operations of the pin lifting-lowering driver 134, the suction driver 135, the X-direction driver 141 and the Z-direction driver 142. The controller 110 includes a CPU, a RAM (Random Access Memory), a ROM (Read Only Memory) and a storage device. The RAM is used as a work area for the CPU. The operation of each component in the substrate processing apparatus 100 is controlled by execution of a processing program stored in the storage device on the RAM by the CPU.

In a period during which the substrate processing apparatus 100 applies the processing liquid to the substrate, the nozzle block 151 of the nozzle device 150 is moved in the +X direction in the space above the substrate W with the substrate W held by suction on the plate member 131. At this time, the bottom surface of the nozzle block 151 is close to the substrate processing surface Wp. The position (height) of the nozzle device 150 in the Z direction is set such that the distance between the bottom surface of the nozzle device 150 and the substrate processing surface Wp is equal to or smaller than the maximum distance with which the processing liquid in the nozzle block 151 is drawn from the discharge port 151*a* to the substrate processing surface Wp by capillary action. In this manner, a process of applying the processing liquid onto the substrate W while supplying the processing liquid from the discharge port 151*a* of the nozzle device 150 by utilizing capillary action is referred to as a capillary coating process.

Figure 2:
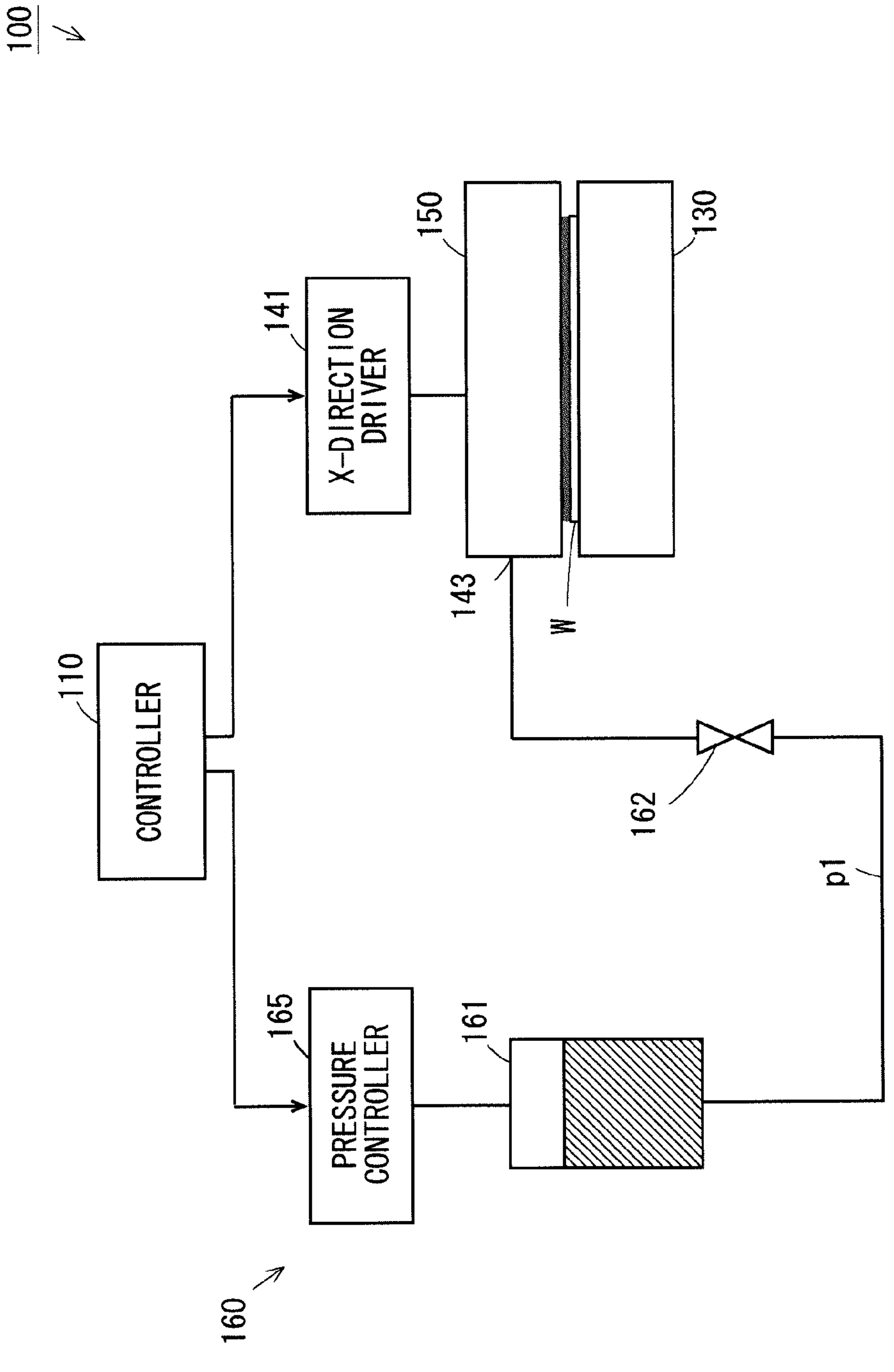
FIG. 2 is a diagram showing the basic configuration of a processing liquid supply system.

FIG. 2 is a diagram showing the basic configuration of a processing liquid supply system. In FIG. 2, the configurations of the stage supports 120, the stage device 130, the nozzle supports 140 and the nozzle device 150, described above, are not shown.

The substrate processing apparatus 100 further includes the processing liquid supply system 160. The processing liquid supply system 160 includes a storage 161, a valve 162, a pressure controller 165 and a pipe p1. The storage 161 is connected to the liquid supplier 143 of the nozzle device 150 through the pipe p1. The valve 162 is arranged between the storage 161 and the liquid supplier 143 of the nozzle device 150. The storage 161 stores the processing liquid used for the capillary coating process. The valve 162 is used to switch between supply of the processing liquid to the nozzle device 150 and stop of the supply of the processing liquid to the nozzle device 150.

The pressure controller 165 changes the pressure in the storage 161. In the present embodiment, the pressure controller 165 is an electropneumatic regulator. The pressure controller 165 is controlled by the controller 110. The controller 110 controls the pressure controller 165 to adjust the pressure in the storage 161. Thus, the pressure of the processing liquid in the nozzle device 150 is adjusted.

Because the substrate processing apparatus 100 includes the pressure controller 165, it is not necessary to align the height of the liquid surface of the processing liquid contained in the storage 161 with the height of the discharge port 151*a* of the nozzle device 150. Therefore, it is not necessary to perform complicated control for adjusting the height of the liquid surface of the processing liquid contained in the storage 161. Further, because a negative or positive pressure can be applied to the processing liquid in the nozzle block 151, an amount of the processing liquid to be discharged from the discharge port 151*a* can be adjusted. As for the pressure controller 165, the configuration other than the electropneumatic regulator may be used as long as the pressure in the storage 161 can be adjusted. For example, the pressure controller 165 may be configured to relatively adjust the height of the liquid surface of the processing liquid contained in the storage 161 and the height of the discharge port 151*a* of the nozzle device 150.

In a period during which the capillary coating process is performed, a force exerted in a direction opposite to the outward of the discharge port 151*a* is applied to the processing liquid in the nozzle block 151. Specifically, the pressure controller 165 makes the pressure in the storage 161 be a negative pressure. A negative pressure is a first pressure lower than an outside air pressure. The first pressure changes according to the type of the processing liquid, the physical properties of the substrate processing surface Wp of the substrate W and the shape of the nozzle block 151. The first pressure is preferably 0 Pa to 500 Pa.

Figure 3:
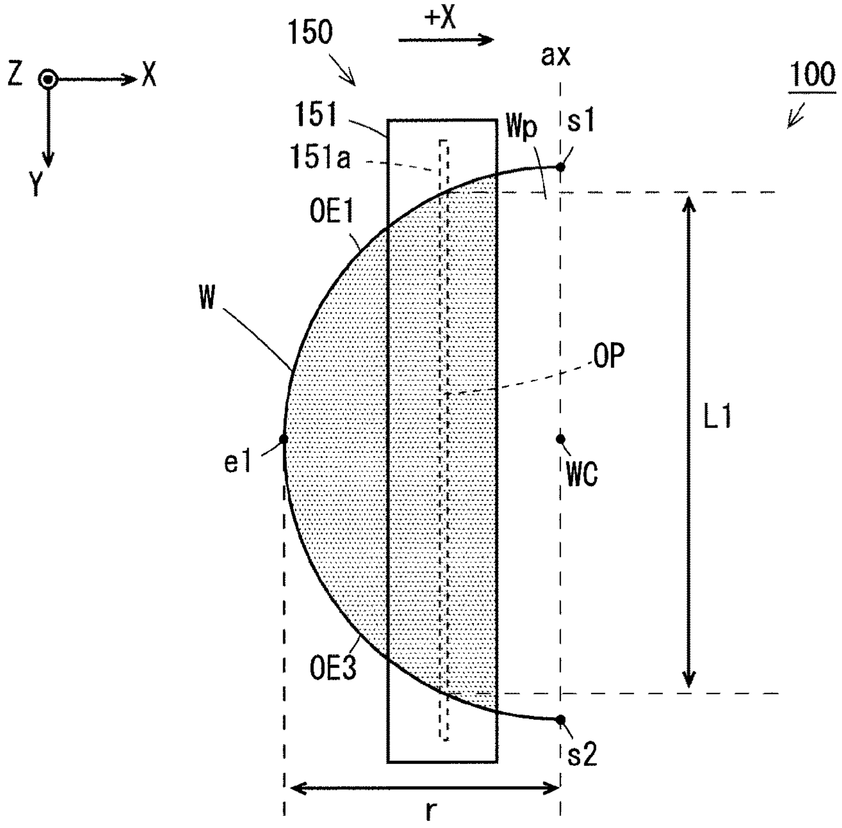
FIG. 3 is a plan view of a nozzle device that performs the first half of a capillary coating process.
Figure 4:
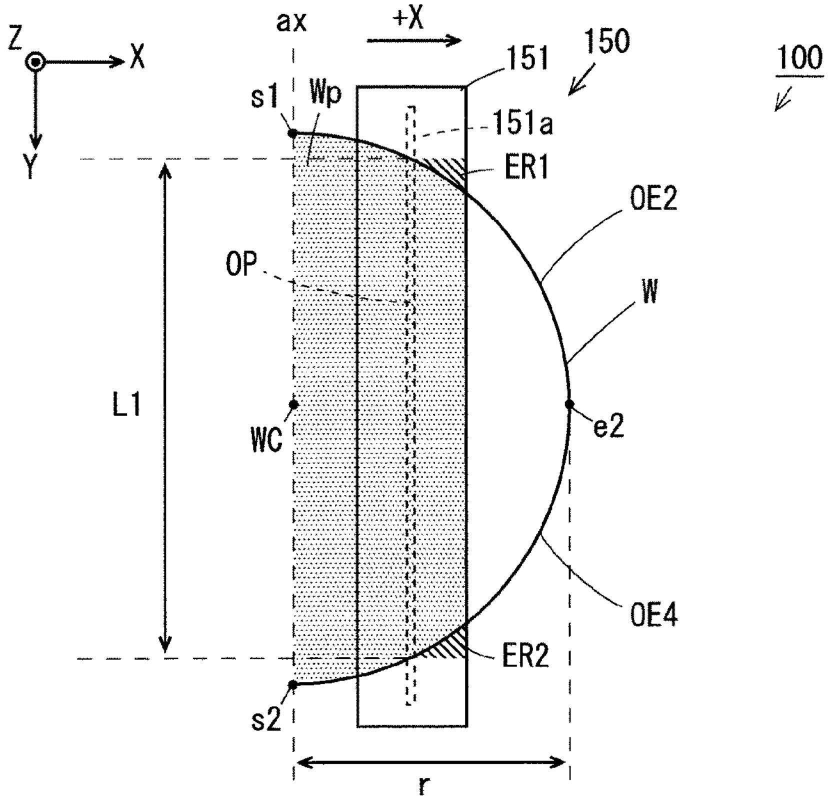
FIG. 4 is a first plan view of a nozzle device that performs the second half of the capillary coating process.
Figure 5:
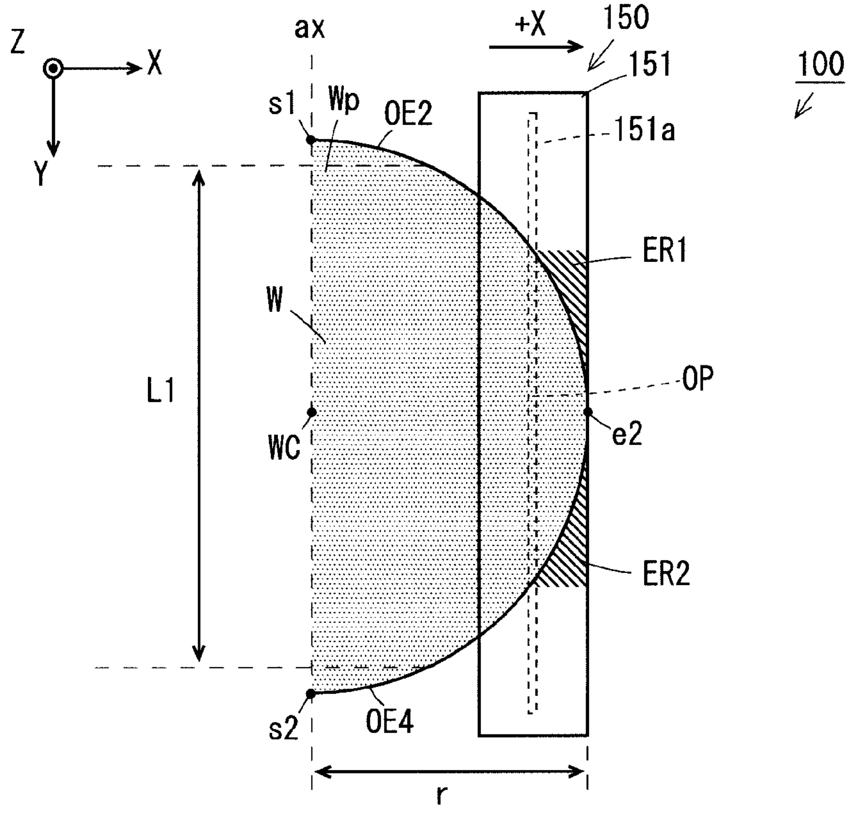
FIG. 5 is a second plan view of the nozzle device that performs the second half of the capillary coating process.

FIGS. 3 to 5 are plan views of the nozzle device 150 for explaining the capillary coating process of applying the processing liquid to the substrate processing surface Wp of the nozzle device 150. In FIGS. 3 to 5, a portion in which the discharge port 151*a* and the substrate processing surface Wp overlap with each other in plan view is referred to as a superimposed portion OP. Further, a portion located at a predetermined distance in a radial direction from the outer periphery of the substrate processing surface Wp of the substrate W is referred to as an annular portion.

FIGS. 3 to 5 show the capillary coating process in a period during which the nozzle block 151 advances in the +X direction from the first end portion e1 of the substrate W toward the second end portion e2 of the substrate W. At this time, the processing liquid is supplied from the discharge port 151*a* to the substrate processing surface Wp of the substrate W due to capillary action that occurs between the bottom surface of the nozzle block 151 and the substrate processing surface Wp.

FIG. 3 is a plan view of the nozzle device 150 that performs the first half of the capillary coating process. With reference to FIG. 3, in the first half of the capillary coating process, the nozzle block 151 advances from the first end portion e1 of the substrate W to the center portion WC of the substrate W. Here, a portion of the discharge port 151*a* located above the substrate W is referred to as the superimposed portion OP. The superimposed portion OP is a portion in which the discharge port 15 overlaps with the substrate W in plan view. The closer the nozzle block 151 to the center portion WC of the substrate W, the larger the length L1 of the superimposed portion OP in the Y direction. In this manner, in the first half of the capillary coating process, the length L1 of the superimposed portion OP in the Y direction increases as the nozzle block 151 is moved in the X direction above the substrate W.

Both ends of the superimposed portion OP in the Y direction are defined by the first end portion e1 and the partial outer edges OE1, OE3 of the substrate processing surface Wp of the substrate W. As the nozzle block 151 is moved in the +X direction, the length of the superimposed portion OP of the nozzle block 151 in the Y direction increases. Thus, the outer portions in contact with both ends of the superimposed portion OP in the Y direction changes from not supplying the processing liquid to supplying the processing liquid. Therefore, a larger amount of the processing liquid is likely to be supplied to the portion which is in the annular portion of the substrate W and in contact with the first end portion e1 and the partial outer edges OE1, OE3 than to other portions.

FIG. 4 is a first plan view of the nozzle device 150 that performs the second half of the capillary coating process. With reference to FIG. 4, in the second half of the capillary coating process, the nozzle block 151 advances from the center portion WC of the substrate W to the second end portion e2 of the substrate W. In this case, the closer the nozzle block 151 to the second end portion e2, the shorter the length L1 of the superimposed portion OP in the Y direction. In this manner, in the second half of the capillary coating process, the length L1 of the superimposed portion OP in the Y direction decreases as the nozzle block 151 advances in the X direction above the substrate W.

Both ends of the superimposed portion OP in the Y direction are defined by the partial outer edges OE2, OE4 and the second end portion e2 of the substrate processing surface Wp of the substrate W. As the nozzle block 151 advances in the +X direction, the length of the superimposed portion OP of the nozzle block 151 in the Y direction decreases. Thus, the portions in contact with the both ends of the superimposed portion OP in the Y direction changes from supplying the processing liquid to not supplying the processing liquid. Further, in the bottom surface of the nozzle block 151, surplus areas ER1, ER2 which are in contact with the both ends of the superimposed portion OP in the Y direction are generated. The surplus areas ER1, ER2 are areas that change from supplying the processing liquid to the substrate W to not supplying the processing liquid to the substrate W. Therefore, a larger amount of the processing liquid is likely to be supplied to the portion which is in the annular portion of the substrate processing surface Wp of the substrate W and in contact with the partial outer edges OE2, OE4 than to the other portions of the substrate processing surface Wp.

FIG. 5 is a second plan view of the nozzle device 150 that performs the second half of the capillary coating process. In regard to the nozzle device 150 shown in FIG. 5, the superimposed portion OP is located closer to the second end portion e2 than that in the nozzle device 150 shown in FIG. 4. When FIGS. 4 and 5 are compared to each other, the closer the nozzle block 151 to the second end portion e2, the larger the lengths of the surplus areas ER1, ER2 in the Y direction. Therefore, the closer the portion, which is in the annular portion of the substrate processing surface Wp of the substrate W, to the second end portion e2, the larger an amount of the processing liquid to be supplied, as compared to the other portions of the substrate processing surface Wp.

In this manner, in the capillary coating process, the outer periphery of the substrate W defines the both end portions of the superimposed portion OP, and the state in the both end portions of the superimposed portion OP changes. Further, a larger amount of the processing liquid is likely to be supplied to the annular portion of the substrate processing surface Wp of the substrate W than to the other portions of the substrate processing surface Wp. Here, a change of the length of the superimposed portion OP in the Y direction in a case in which the moving speed of the nozzle block 151 is made constant in the capillary coating process will be described.

Figure 6:
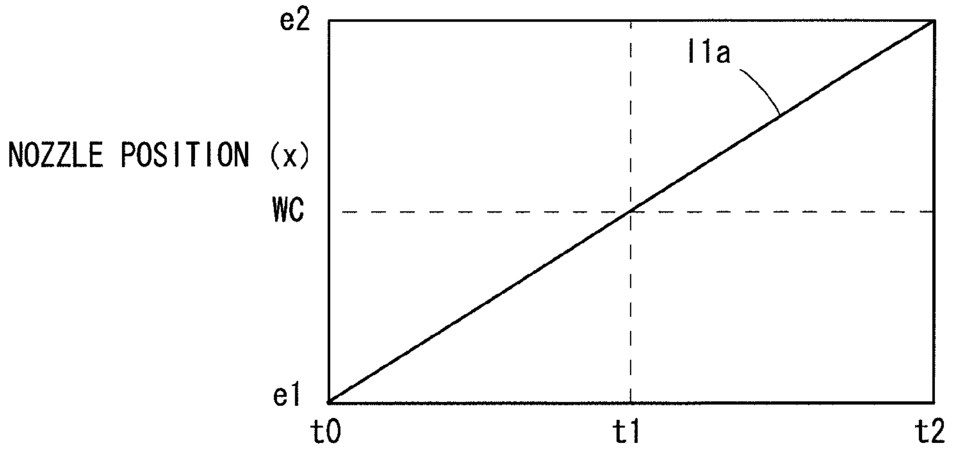
FIG. 6 is a first diagram showing one example of a change of a position of a nozzle block over time during capillary coating.

FIG. 6 is a first diagram showing one example of a change of a position of a nozzle block over time during capillary coating. In the capillary coating process, a point in time at which the nozzle block 151 is located at the first end portion e1 is a start point to in time of capillary coating, and a point in time at which the nozzle block 151 is located at the second end portion e2 is an end point t2 in time of capillary coating. An intermediate point in time between the start point to in time and the end point t2 in time is set as a t1. In FIG. 6, the abscissa indicates an elapsed period of time of capillary coating, and the ordinate indicates a position x of the nozzle block 151.

With reference to FIG. 6, a straight line l1*a* indicates the change of the position x of the nozzle block 151 over time. Because the nozzle block 151 is moved at a constant speed, the position x of the nozzle block 151 increases in proportion to an elapse of a period t of time. Here, the straight line l1*a* is expressed by the following formula (1).

[Formula 1]

$$x=f(t) \qquad (1)$$

The straight line l1*a* indicates that the nozzle block 151 is located at the first end portion e1 at the start point to in time of capillary coating, is located at the center portion WC at the intermediate point t1 in time of capillary coating and is located at the second end portion e2 at the end point t2 in time of capillary coating.

Figure 7:
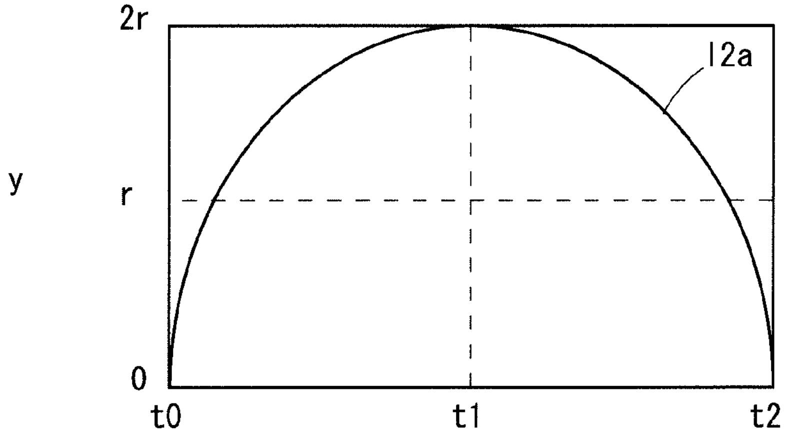
FIG. 7 is a first diagram showing one example of a change of a length in a Y direction of a superimposed portion over time during capillary coating.

FIG. 7 is a first diagram showing one example of a change of a length in a Y direction of a superimposed portion over time during capillary coating. In FIG. 7, the abscissa indicates the elapsed period t of time of capillary coating, and the ordinate indicates a size y of the length L1 of the superimposed portion OP in the Y direction. A curve 12*a* indicates the change of the length L1 of the superimposed portion OP in the Y direction over time during capillary coating. As indicated by the curve 12*a*, it is understood that the length L1 of the superimposed portion OP in the Y direction changes due to the shape of the outer periphery of the circular substrate W in a case in which the nozzle block 151 is moved at a constant speed. The curve 12*a* is expressed by the following formula (2).

[Formula 2]

$$y=r^2-x^2=\sqrt{r^2-(f(t))^2} \qquad (2)$$

According to the curve 12*a*, during capillary coating, the size y of the length L1 of the superimposed portion OP in the Y direction increases rapidly near the start point to in time, gradually increases toward the intermediate point t1 in time after rapidly increasing and reaches a diameter 2r of the substrate W at the intermediate point t1 in time. It is also found that the size y of the length L1 of the superimposed portion OP in the Y direction gradually decreases from the intermediate point t1 in time to a point near the end point t2 in time and rapidly decreases from a point near the end point t2 in time to the end point t2 in time.

Figure 8:
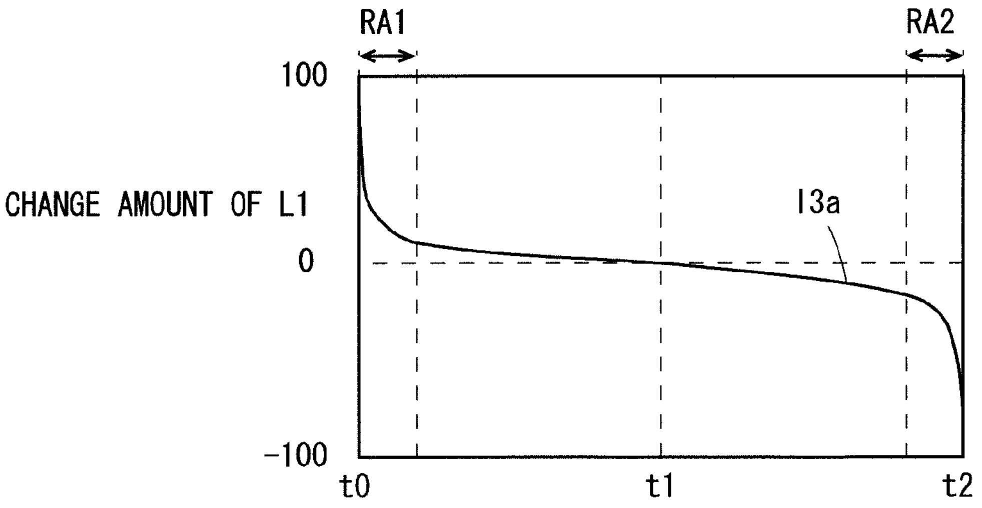
FIG. 8 is a first diagram showing one example of a change in change amount per unit time of the length of the superimposed portion in the Y direction during capillary coating.

FIG. 8 is a first diagram showing one example of a change in change amount per unit time of the length of the superimposed portion in the Y direction during capillary coating. In FIG. 8, the abscissa indicates the elapsed period t of time of capillary coating, and the ordinate indicates the change amount of the length L1 per unit time. A curve 13*a* indicates a change in change amount of the length L1 of the superimposed portion OP in the Y direction over time. The curve 13*a* is expressed by the following formula (3). The formula (3) can be obtained by a differential calculus of the formula (2) by a point in time.

$$y' = \frac{dy}{dt} = \frac{1}{2}\left(r^2-(f(t))^2\right)^{-\frac{1}{2}}\cdot(-2f(t))\cdot\frac{d}{dt}f(t)\ \ldots \qquad \text{[Formula 3]}$$

In regard to the curve 13*a*, in a period RA1 until a predetermined period of time elapses from the point to in time, the change amount per unit time of the length L1 of the superimposed portion OP in the Y direction is significantly changed. In regard to the curve 13*a*, in a period RA2 to a point t2 in time from a point in time earlier than the point t2 in time by a predetermined period of time, the change amount per unit time of the length L1 of the superimposed portion OP in the Y direction is significantly changed.

As described above, in a case in which the nozzle block 151 is moved from the first end portion e1 to the center portion WC of the substrate W, the both end portions of the superimposed portion OP changes from not being supplied with the processing liquid to being supplied with the processing liquid. In a case in which the moving speed of the nozzle block 151 is constant, the change amount per unit time of the length L1 of the superimposed portion OP in the Y direction constantly changes. That is, the change amount per unit time of an area of the superimposed portion OP constantly changes. Therefore, the thickness of the film of the processing liquid in the portions corresponding to the partial outer edges OE1, OE3 of the annular portion of the substrate processing surface Wp is larger than those in the other portions.

In particular, the change amount per unit time of the length L1 of the superimposed portion OP in the Y direction in the period RA1 is larger than those in the other periods. That is, in regard to the change amount per unit time of the area of the superimposed portion OP, the change amount in the period RA1 is larger than those in the other periods. Therefore, in the annular portion of the substrate processing surface Wp, the thickness of the film of the processing liquid in the portion overlapping with the nozzle block 151 in the period RA1 is larger than those in the other portions.

Further, in a case in which the nozzle block 151 is moved from the center portion WC to the second end portion e2 of the substrate W, the both end portions of the superimposed portion OP change from supplying the processing liquid to not supplying the processing liquid. In a case in which the nozzle block 151 is moved at a constant speed, the change amount per unit time of the length L1 of the superimposed portion OP in the Y direction constantly changes. That is, the change amount per unit time of the area of the superimposed portion OP constantly changes. Therefore, in the annular portion of the substrate processing surface Wp, the thickness of the film of the processing liquid in the portions corresponding to the partial outer edges OE2, OE4 is larger than those in the other portions.

In particular, the change amount per unit time of the length L1 of the superimposed portion OP in the Y direction in the period RA2 is larger than those in the other periods. That is, in regard to the change amount per unit time of the area of the superimposed portion OP, the change amount in the period RA2 is larger than those in the other periods. Therefore, in the annular portion of the substrate processing surface Wp, the thickness of the film of the processing liquid in the portion overlapping with the nozzle block 151 in the period RA2 is larger than those in the other portions.

As such, in the substrate processing apparatus 100 of the present embodiment, the moving speed of the nozzle block 151 changes based on the shape of the partial outer edges OE1 to OE4 of the substrate W. Specifically, in the substrate processing apparatus 100 of the present embodiment, the change amount per unit time of the length L1 of the superimposed portion OP in a longitudinal direction is constant in a period during which the capillary coating process is performed.

(2) Operation Example of Substrate Processing Apparatus 100

Figure 9:
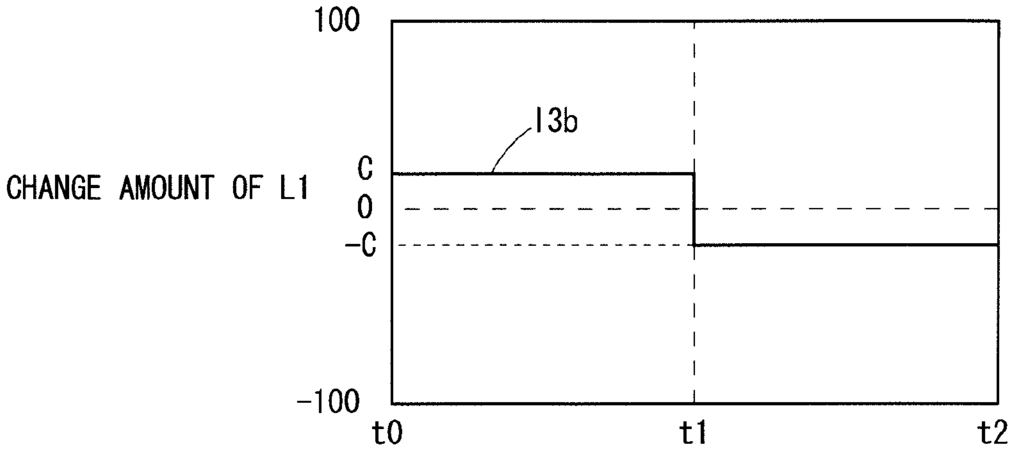
FIG. 9 is a second diagram showing one example of a change in change amount per unit time of the length of the superimposed portion in the Y direction over time during capillary coating.

FIG. 9 is a second diagram showing one example of a change in change amount per unit time of the length of the superimposed portion in the Y direction over time during capillary coating. The abscissa indicates time, and the ordinate indicates the change amount per unit time of the length L1 of the superimposed portion OP in the Y direction. With reference to FIG. 9, the change amount per unit time of the length L1 of the superimposed portion OP in the Y direction is constant in the first half (t0≤t<t1) and constant in the second half (t1≤t≤t2. An ideal change amount of the length L1 of the superimposed portion OP in the Y direction is expressed by the following formula (4).

[Formula 4]

$$y' = \frac{dy}{dt} = C \quad (t0 \leqq t < t1)\ \ldots \qquad (4)$$

-continued $$y' = \frac{dy}{dt} = -C \quad (t1 \leqq t \leqq t2) \ldots \tag{4'}$$

In the formula (4), C is a constant. The change amount per unit time of the length y of the superimposed portion OP in the Y direction is constant. The size of the superimposed portion OP is increased or decreased at both ends in the Y direction due to the movement of the nozzle block 151 in the X direction. The portion the size of which increases in the superimposed portion OP changes from not discharging the processing liquid to discharging the processing liquid. The portion the size of which decreases in the superimposed portion OP changes from discharging the processing liquid to not discharging the processing liquid. Because the change amount per unit time of the length of the superimposed portion OP in the Y direction is constant, the change amount per unit time of the portion the state of which changes in the superimposed portion OP is constant. Thus, it is possible to suppress a change in thickness of the film of the processing liquid formed in the annular portion of the substrate W in the X direction.

Figure 10:
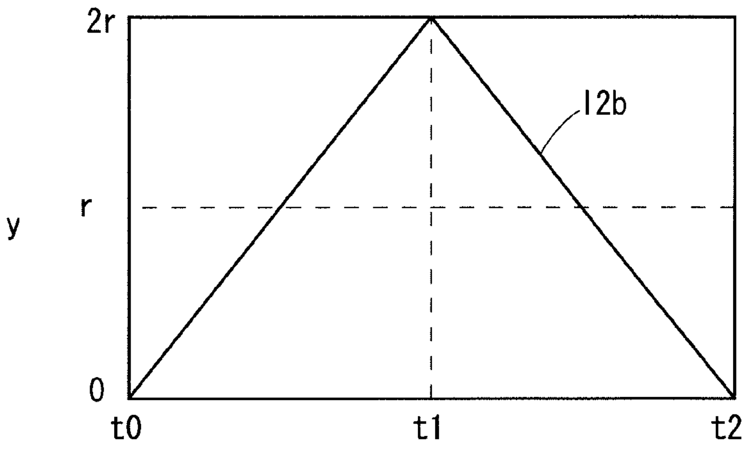
FIG. 10 is a second diagram showing one example of a change of the length of the superimposed portion in the Y direction over time during capillary coating.

FIG. 10 is a second diagram showing one example of a change of the length of the superimposed portion in the Y direction over time during capillary coating. The abscissa indicates time, and the ordinate indicates the length of the superimposed portion OP in the Y direction. The length L1 of the superimposed portion OP in the Y direction is proportional to the time. The length L1 of the superimposed portion OP in the Y direction increases from 0 to 2r in the first half and decreases from 2r to 0 in the second half. The length L1 of the superimposed portion OP in the Y direction is obtained by integration of the formulas (4) and (4').

Figure 11:
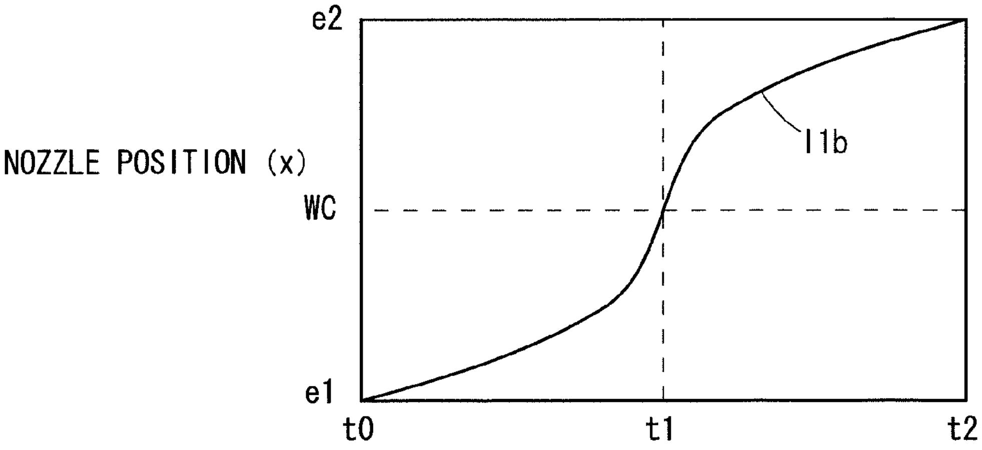
FIG. 11 is a second diagram showing one example of a change of a position of the nozzle block over time during capillary coating.

FIG. 11 is a second diagram showing one example of a change of a position of the nozzle block over time during capillary coating. The abscissa indicates time, and the ordinate indicates the position of the nozzle block 151. The position x of the nozzle block 151 is expressed by the following formula (6). The formula (6) is a general solution of the following formula (5) which is a differential equation in regard to the nozzle position x. The formula (5) is obtained when the formula (4) and the formula (1) are substituted into the formula (3). In the formula (6), k is a constant.

[Formula 5]

$$\frac{dx}{dt} = C \cdot \frac{1}{x} \cdot \sqrt{r^2 - x^2} \ldots \tag{5}$$

[Formula 6]

$$x = f(t) = \sqrt{2kCt - k^2 - C^2t^2 + r^2} = \sqrt{r^2 - (Ct - k)^2} \ldots \tag{6}$$

Next, a specific example of the speed control in the capillary coating process will be described. Here, a processing period of time for the capillary coating process is 100 seconds. The processing period of time for the capillary coating process is a period of time required for the discharge port 151*a* of the nozzle block 151 is to be moved from the first end portion e1 to the second end portion e2. Here, divided intervals obtained when the processing period required for the capillary coating processing is divided into 100 equal intervals are defined.

Each time the capillary coating for divided intervals is started, the controller 110 obtains the start positions of a plurality of divided intervals and the end positions of the divided intervals defined by the formula (6). Further, the controller 110 determines the moving speed of the nozzle block 151 in each of the divided intervals. The controller 110 controls the X-direction driver 141 to change the moving speed of the nozzle block 151 for each divided interval. Thus, the capillary coating process can be performed with the change amount per unit time of the length L1 of the superimposed portion OP in the Y direction be constant in each of a plurality of divided intervals.

While divided intervals obtained when the processing period required for the capillary coating process is divided into 100 equal intervals are defined by way of example in the above-mentioned specific example, the number of divided intervals may be larger or smaller than 100. Further, instead of division of the processing period of time for the capillary coating process, the substrate processing surface Wp of the substrate W may be divided into a plurality of equal sections in the X direction. Further, the plurality of divided sections may not be arranged at equal intervals, and may be arranged at different intervals in the X direction. In this case, the larger the change amount of the length L1 of the superimposed portion OP in the longitudinal direction per unit distance in the X direction is, the shorter the length of the divided section in the X direction may be.

Figure 12:
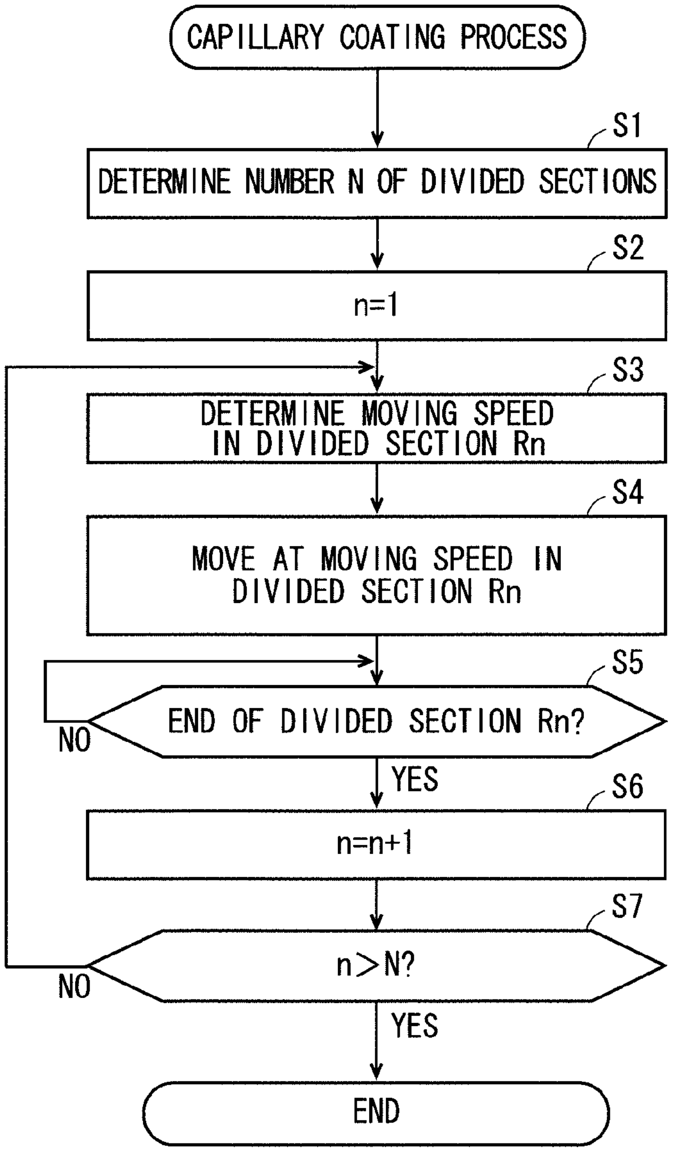
FIG. 12 is a flowchart showing one example of a flow of the capillary coating process.

FIG. 12 is a flowchart showing one example of a flow of the capillary coating process. The capillary coating process is a process performed by the CPU included in the controller 110 when the CPU executes a capillary coating processing program stored in the RAM.

With reference to FIG. 12, the CPU included in the controller 110 determines the number N of divided sections of the substrate W to be processed in the X direction (step S1). In the above-mentioned specific example, the number N of the divided sections is 100. The number N of the divided sections may be determined in advance according to the substrate W to be processed. In the next step S2, the CPU of the controller 110 sets a variable n to 1. The variable n indicates the number assigned to a divided section to be processed.

In the next step S3, the CPU of the controller 110 determines the moving speed in a divided section Rn. Specifically, the nozzle position x for each of the start point in time and the end point in time of the divided section Rn is obtained based on the formula (6). Then, the moving distance is calculated based on the difference between the nozzle position x at the start point in time and the nozzle position x at the end point in time, and the moving speed is calculated based on the moving distance and the divided section Rn.

In the next step S4, the controller 110 controls the X-direction driver 141 to move the nozzle block 151 at the moving speed determined in the step S3. In the next step S5, the CPU of the controller 110 determines whether the process for the divided section Rn has ended. In a case in which the process for the divided section Rn has not ended, the nozzle block 151 continues to move at the moving speed determined in the step S3. In a case in which the process for the divided section Rn has ended, the process proceeds to the step S6.

In the next step S6, the CPU of the controller 110 adds 1 to the variable n, and the process proceeds to the step S7. In the next step S7, the CPU of the controller 110 determines whether the variable n is larger than the number N of the divided sections. In a case in which the variable n is equal to or smaller than the number N of the divided sections, the process returns to the step S3. The process for the steps S3 to S6 is repeated until the variable n is larger than the number N of the divided sections. Thus, the nozzle block 151 is moved at the moving speed determined for each of the divided sections R1 to RN. In a case in which it is determined in the step S7 that the variable n is larger than the number N of the divided sections, the capillary coating process ends.

(3) Effects of Embodiments

With the substrate processing apparatus 100 of the above-mentioned embodiment, the nozzle block 151 and the substrate W are relatively moved at the moving speed that is determined based on the shapes of the partial outer edges OE1 to OE4 of the substrate W. Thus, a change in force applied to the processing liquid in the annular portion located at the predetermined distance in the radial direction from the outer periphery of the substrate processing surface Wp of the substrate W can be made constant. Therefore, it is possible to suppress an increase in thickness of the processing liquid formed in the annular portion. As a result, it is possible to suppress variations in thickness of the film of the processing liquid formed on the substrate W.

Further, in a period during which the nozzle block 151 and the substrate W are relatively moved in the X direction, the change amount per unit time of the length L1 of the superimposed portion OP in the Y direction is constant. Further, the nozzle block 151 and the substrate W are relatively moved in the X direction, so that the size of the superimposed portion OP increases or decreases at the both ends in the Y direction. The portion the size of which increases in the superimposed portion OP changes from not discharging the processing liquid to discharging the processing liquid. The portion the size of which decreases in the superimposed portion OP changes from discharging the processing liquid to not discharging the processing liquid. Because the change amount per unit time of the length L1 of the superimposed portion OP in the Y direction is constant, the change amount per unit time of the portion the state of which changes in the superimposed portion OP is constant. Thus, it is possible to suppress a change in thickness of the film in the X direction of the processing liquid formed in the annular portion located at the predetermined distance in the radial direction from the partial outer edges OE1 to OE4 of the substrate processing surface Wp of the substrate W.

Further, because the moving speed of the nozzle block 151 is determined with use of the above-mentioned formula (6), the moving speed of the nozzle block 151 can be easily determined. Therefore, the nozzle block 151 can be easily controlled.

(4) Other Embodiments (4-1) While an increase in thickness of the processing liquid in the partial outer edges OE1 to OE4 of the substrate W is suppressed by the change of the moving speed of the nozzle block 151 based on the outer peripheral shape of the substrate by way of example in the above-mentioned embodiment, the present disclosure is not limited to this. When the nozzle block 151 is moved from the center portion WC to the second end portion e2, the surplus areas ER1, ER2 are generated (see FIGS. 4 and 5). As such, in addition to the operation example of the substrate processing apparatus 100 of the above-mentioned embodiment, the controller 110 may make the pressure in the storage 161 be the second pressure lower than the first pressure during movement of the nozzle block 151 from the center portion WC to the second end portion e2 by controlling the pressure controller 165 of FIG. 2. In a case in which the pressure in the storage 161 is the second pressure, a force directed opposite to the outward of the discharge port 151*a* is further applied to the processing liquid in the nozzle block 151. At the second pressure, it is possible to reduce an amount of the processing liquid that be supplied to the surplus areas ER1, ER2 while maintaining an amount of the processing liquid that is supplied to the substrate processing surface Wp in capillary coating. The second pressure changes according to the type of the processing liquid, the physical properties of the substrate processing surface Wp of the substrate W and the shape of the nozzle block 151. The second pressure is preferably 0 Pa to 500 Pa.

In a case in which the pressure in the storage 161 is the second pressure, it is possible to reduce an amount of the processing liquid that can be supplied to the surplus areas ER1, ER2 in capillary coating. As a result, it is possible to further suppress an increase in thickness of the film of the processing liquid formed on the substrate W in the partial outer edges OE2, OE4 of the substrate processing surface Wp. Therefore, it is possible to suppress variations in thickness of the film of the processing liquid formed on the substrate processing surface Wp. Similarly, the pressure in the storage 161 may be set to the second pressure when the nozzle block 151 is moved from the first end portion e1 to the center portion WC. Further, the pressure in the storage 161 may change in accordance with the change of the moving speed of the nozzle block 151.

(4-2) While the nozzle supports 140 are an example of the moving mechanism in the above-mentioned embodiment, the present disclosure is not limited to this. For example, the substrate processing apparatus 100 may further include the configuration with which the plate member 131 can be moved in the X direction as a moving mechanism. In this case, the capillary coating process may be performed by movement of the plate member 131 with respect to the stationary nozzle block 151, or may be performed by movement of the plate member 131 with respect to the moving nozzle block 151.

(5) Overview of Embodiments (Item 1) A substrate processing apparatus according to one aspect of the present disclosure includes a holder that holds a substrate with a main surface of the substrate directed upwardly, the substrate having an at least partially circular outer periphery, a nozzle having a bottom portion in which a discharge port extending in one direction is formed, a mover that, above the substrate held by the holder, relatively moves at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action, and a controller that controls the mover and relatively moves the nozzle and the substrate at a moving speed determined based on an outer peripheral shape of the substrate.

With the substrate processing apparatus according to item 1, the mover relatively moves at least one of the nozzle and the substrate with respect to the other one with a gap equal to or smaller than the predetermined distance provided between the bottom portion of the nozzle and the substrate, above the substrate. Therefore, the processing liquid is applied to the main surface of the substrate from the discharge port of the nozzle due to capillary action. Because the nozzle and the substrate are relatively moved at the moving speed determined based on the outer peripheral shape of the substrate, a change in force applied to the processing liquid in the annular portion located at a predetermined distance in the radial direction from the outer periphery of the main surface of the substrate can be made constant. Thus, it is possible to suppress an increase in thickness of the processing liquid formed in the annular portion. As a result, it is possible to suppress variations in thickness of the film of the processing liquid formed on the substrate.

(Item 2) The substrate processing apparatus according to item 1, wherein the controller may determine the moving speed based on a change amount per unit time of a length in the one direction of a superimposed portion located above the substrate in the discharge port.

With the substrate processing apparatus according to item 2, the relative moving speed is determined based on the change amount per unit time of the length in one direction of the superimposed portion located above the substrate in the discharge port of the nozzle. Therefore, the relative moving speed of the nozzle and the substrate can be easily determined.

(Item 3) The substrate processing apparatus according to item 2, wherein the controller may determine a speed at which the change amount per unit time of the length in the one direction of the superimposed portion is constant as the moving speed.

With the substrate processing apparatus according to item 3, the change amount per unit time of the length in the one direction of the superimposed portion is constant during relative movement of the nozzle and the substrate in the intersecting direction. Because the nozzle and the substrate are relatively moved in the intersecting direction, the size of the superimposed portion is increased or decreased at the both ends. The portion the size of which increases in the superimposed portion changes from not discharging the processing liquid to discharging the processing liquid. The portion the size of which decreases in the superimposed portion changes from discharging the processing liquid to not discharging the processing liquid. Because the change amount per unit time of the length of the superimposed portion in the one direction is constant, the change amount per unit time of the portion the state of which changes in the superimposed portion is constant. Thus, it is possible to suppress a change in thickness of the film of the processing liquid formed in the annular portion located at the predetermined distance in the radial direction from the outer periphery of the main surface of the substrate.

(Item 4) The substrate processing apparatus according to any one of items 1 to 3, wherein the controller may determine the moving speed with use of a following relational expression.

$$x=f(t)=\sqrt{r^2-(Ct-k)^2} \quad \text{[Formula 7]}$$

In this regard, x is the position of the nozzle with respect to the substrate, r is a point in time, r is the radius of the substrate, and k and C are constants.

With the substrate processing apparatus according to item 4, because the moving speed is determined with use of the above-mentioned relational expression, the moving speed can be easily determined. Therefore, the mover can be easily controlled.

(Item 5) The substrate processing apparatus according to any one of items 1 to 4, wherein one end portion of the substrate in the intersecting direction may be a first end portion, another end portion of the substrate in the intersecting direction may be a second end portion, and the controller, in a case in which the nozzle and the substrate are relatively moved above the substrate from the first end portion of the substrate to a center of the substrate and then to the second end portion of the substrate, may relatively move the nozzle and the substrate at the moving speed in a period during which the nozzle is located above a position between the center of the substrate and the second end portion.

With the substrate processing apparatus according to item 5, when the nozzle is located above a position between the center of the substrate and the second end portion, the nozzle and the substrate are relatively moved at the moving speed determined based on the outer peripheral shape of the substrate. Therefore, it is possible to suppress a change in thickness of the film of the processing liquid formed on the substrate in a period during which the length in the one direction of the superimposed portion located above the substrate in the discharge port of the nozzle decreases.

(Item 6) The substrate processing apparatus according to any one of items 1 to 5, wherein one end portion of the substrate in the intersecting direction may be a first end portion, another end portion of the substrate in the intersecting direction may be a second end portion, and the controller, in a case in which the nozzle and the substrate are relatively moved above the substrate from the first end portion of the substrate to a center of the substrate and then to the second end portion of the substrate, may relatively move the nozzle and the substrate at the moving speed in a period during which the nozzle is located above a position between the first end portion and the center of the substrate.

With the substrate processing apparatus according to item 6, when the nozzle is located above a position between the first end portion and the center of the substrate, the nozzle and the substrate are relatively moved at the moving speed. Therefore, it is possible to suppress variations in thickness of the film of the processing liquid formed on the substrate in a period during which the length in the one direction of the superimposed portion located above the substrate in the discharge port of the nozzle increases.

(Item 7) The substrate processing apparatus according to any one of items 1 to 6, may further include a pressure controller that applies a first pressure lower than an outside air pressure to the processing liquid in the nozzle.

With the substrate processing apparatus according to item 7, because the first pressure lower than the outside air pressure is applied to the processing liquid in the nozzle, the processing liquid can be supplied from the discharge port to the main surface of the substrate by capillary action.

(Item 8) The substrate processing apparatus according to any one of items 1 to 7, wherein one end portion of the substrate in the intersecting direction may be a first end portion, another end portion of the substrate in the intersecting direction may be a second end portion, and the pressure controller, in a case in which the controller relatively moves the nozzle and the substrate above the substrate from the first end portion of the substrate to a center of the substrate and then to the second end portion of the substrate, may apply a second pressure lower than the first pressure to the processing liquid in the nozzle in a period during which the nozzle is located above a position between the center of the substrate and the second end portion.

With the substrate processing apparatus according to item 8, because the second pressure lower than the first pressure is applied to the processing liquid in the nozzle when the nozzle is located above a position between the center of the substrate and the second end portion, an amount of the processing liquid to be supplied to the substrate in a period during which the nozzle is moved from the center of the substrate to the second end portion is suppressed. Thus, it is possible to further suppress an increase in thickness of the film of the processing liquid formed in the annular portion located at the predetermined distance in the radial direction from the outer periphery of the main surface of the substrate.

(Item 9) The substrate processing apparatus according to any one of items 1 to 7, wherein one end portion of the substrate in the intersecting direction may be a first end portion, another end portion of the substrate in the intersecting direction may be a second end portion, and the pressure controller, in a case in which the controller relatively moves the nozzle and the substrate above the substrate from the first end portion of the substrate to a center of the substrate and then to the second end portion of the substrate, may apply a second pressure lower than the first pressure to the processing liquid in a period during which the nozzle is located above a position between the first end portion and the center of the substrate.

With the substrate processing apparatus according to item 9, because the second pressure lower than the first pressure is applied to the processing liquid in the nozzle when the nozzle is located above a position between the first end portion and the center of the substrate, an amount of the processing liquid supplied to the substrate in a period during which the nozzle is moved from the first end portion of the substrate to the center of the substrate is suppressed. Thus, it is possible to further suppress an increase in thickness of the film of the processing liquid formed in the annular portion located at the predetermined distance in the radial direction from the outer periphery of the main surface of the substrate.

(Item 10) A substrate processing method according to another aspect of the present disclosure is performed in a substrate processing apparatus, wherein the substrate processing apparatus includes a holder that holds a substrate with a main surface of the substrate directed upwardly, the substrate having an at least partially circular outer periphery, and a nozzle having a bottom portion in which a discharge port extending in one direction is formed, and the substrate processing method includes a moving step of, above the substrate held by the holder, relatively moving at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action, and determining a moving speed at which the nozzle and the substrate are relatively moved based on an outer peripheral shape of the substrate.

(Item 11) The substrate processing apparatus according to any one of items 1 to 9, wherein a length of the discharge port in the one direction may be larger than a length in the one direction of the substrate.

In the substrate processing apparatus according to item 11, because the length of the discharge port in the one direction is larger than the length in the one direction of the substrate, the processing liquid can be supplied to the entire main surface of the substrate when the nozzle is moved once.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A substrate processing apparatus comprising:

a holder that holds a substrate with a main surface of the substrate directed upwardly, the substrate having an at least partially circular outer periphery;

a nozzle having a bottom portion in which a discharge port extending in one direction is formed;

a mover that, above the substrate held by the holder, relatively moves at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action;

a controller configured to control the mover and relatively move the nozzle and the substrate at a moving speed determined based on an outer peripheral shape of the substrate and a change amount per unit time of a length in the one direction of a superimposed portion located above the substrate in the discharge port; and a pressure controller that applies a first pressure that is a negative pressure lower than an outside air pressure to the processing liquid in the nozzle, wherein one end portion of the substrate in the intersecting direction is a first end portion, another end portion of the substrate in the intersecting direction is a second end portion, and the pressure controller, in a case in which the nozzle and the substrate are relatively moved above the substrate from the first end portion of the substrate to a center of the substrate and then to the second end portion of the substrate, configured to relatively move the nozzle and the substrate at the moving speed, and apply a second pressure lower than the first pressure to the processing liquid in the nozzle in a period during which the nozzle is located above a position between the center of the substrate and the second end portion.

2. The substrate processing apparatus according to claim 1, wherein the controller determines a speed at which the change amount per unit time of the length in the one direction of the superimposed portion is constant as the moving speed.

3. The substrate processing apparatus according to claim 1, wherein the controller determines the moving speed with use of a following relational expression,

[Formula 1]

$$x=f(t)=\sqrt{r^2-(Ct-k)^2} \quad (1)$$

x is a position of the nozzle with respect to the substrate, t is a point in time, r is a radius of the substrate, and k and C are constants.

4. A substrate processing apparatus comprising:

a holder that holds a substrate with a main surface of the substrate directed upwardly, the substrate having an at least partially circular outer periphery;

a nozzle having a bottom portion in which a discharge port extending in one direction is formed;

a mover that, above the substrate held by the holder, relatively moves at least one of the nozzle and the substrate with respect to another one in an intersecting direction that intersects with the one direction with a gap equal to or smaller than a predetermined distance provided between the bottom portion of the nozzle and the main surface of the substrate in order to cause a processing liquid to be discharged from the discharge port of the nozzle to the main surface of the substrate with use of capillary action;

a controller configured to control the mover and relatively move the nozzle and the substrate at a moving speed determined based on an outer peripheral shape of the substrate and a change amount per unit time of a length in the one direction of a superimposed portion located above the substrate in the discharge port; and a pressure controller that applies a first pressure that is a negative pressure lower than an outside air pressure to the processing liquid in the nozzle;

wherein one end portion of the substrate in the intersecting direction is a first end portion, another end portion of the substrate in the intersecting direction is a second end portion, and the pressure controller, in a case in which the nozzle and the substrate are relatively moved above the substrate from the first end portion of the substrate to a center of the substrate and then to the second end portion of the substrate, configured to relatively move the nozzle and the substrate at the moving speed, and apply a second pressure lower than the first pressure to the processing liquid in the nozzle in a period during which the nozzle is located above a position between the first end portion and the center of the substrate.

5. The substrate processing apparatus according to claim 4, wherein the controller determines a speed at which the change amount per unit time of the length in the one direction of the superimposed portion is constant as the moving speed.

6. The substrate processing apparatus according to claim 4, wherein the controller determines the moving speed with use of a following relational expression,

[Formula 1]

$$x=f(t)=\sqrt{r^2-(Ct-k)^2} \quad (1)$$

x is a position of the nozzle with respect to the substrate, t is a point in time, r is a radius of the substrate, and k and C are constants.

* * * * *